United States Patent [19]

Youn et al.

[11] Patent Number: 5,862,043

[45] Date of Patent: Jan. 19, 1999

[54] SWITCH COUPLED ACTIVE FORWARD CONVERTER FOR OBTAINING A HIGH POWER FACTOR AT A SINGLE POWER STAGE

[75] Inventors: Myung Joong Youn, Seoul; Gun Woo Moon, Taejon-Karen; Jun Young Lee; Che Hong Ahn, both of Seoul, all of Rep. of Korea

[73] Assignee: Korea Telecommunication Authority, Seoul, Rep. of Korea

[21] Appl. No.: 831,203

[22] Filed: Apr. 2, 1997

[30] Foreign Application Priority Data

Apr. 2, 1996 [KR] Rep. of Korea .......................... 96-9915

[51] Int. Cl.[6] ................................................. H02M 3/335
[52] U.S. Cl. ............................................. 363/21; 363/131
[58] Field of Search ................................ 363/21, 131, 97, 363/20

[56] References Cited

U.S. PATENT DOCUMENTS

| 5,224,025 | 6/1993 | Divan et al. | 363/16 |
| 5,471,376 | 11/1995 | Tsai et al. | 363/20 |
| 5,508,904 | 4/1996 | Hara | 363/21 |
| 5,625,541 | 4/1997 | Rozman | 363/21 |

*Primary Examiner*—Shawn Riley
*Attorney, Agent, or Firm*—Merchant, Gould, Smith, Edell, Welter & Schmidt

[57] ABSTRACT

A switch coupled active forward converter comprising an AC power supply circuit for supplying AC power, a filtering circuit connected to the AC power supply circuit, for filtering an output current from the AC power supply circuit, an up converter connected to the filtering circuit, for generating a saw tooth wave signal in response to an output voltage from the filtering circuit, the saw tooth wave signal having a peak value following an input voltage to the AC power supply circuit when a switch ON operation is performed, a clamping circuit connected in common to the up converter, AC power supply circuit and filtering circuit, for clamping an output voltage from the up converter to a desired level, a transformer having a primary coil connected to the up converter, and an output circuit connected to a secondary coil of the transformer.

3 Claims, 3 Drawing Sheets

SWITCH COUPLED ACTIVE FORWARD CONVERTER FOR OBTAINING A HIGH POWER FACTOR AT A SINGLE POWER STAGE

BACKGROUND OF THE INVENTION

1. Field of the Invention

The present invention relates in general to an active forward converter, and more particularly to a switch coupled active forward converter which is implemented by coupling a forward converter with a step up converter, so that it can obtain a high power factor at a single power stage, accurately perform an output direct current (DC) voltage control operation, have a high efficiency and be applied to a low-capacity device.

2. Description of the Prior Art

Generally, a two-step converter has been implemented to be applied to a large-capacity device. However, such a conventional two-step converter has difficulty in accurately performing harmonic rectification and output voltage control operations. Further, the conventional two-step converter has many components for supplying a large amount of power, even when only a small amount of power is required, resulting in an economical loss.

SUMMARY OF THE INVENTION

The present invention has been made in view of the above problem, and it is an objective of the present invention to provide a switch coupled active forward converter which is small in the number of components, has a desired power factor characteristic and a small harmonic distortion, accurately performs an output voltage control operation and is applicable to a low-capacity device, so as to meet a requirement that the power factor be approximate to a unit power factor.

In accordance with the present invention, the above and other objectives can be accomplished by a provision of a switch coupled active forward converter comprising AC power supply circuit for supplying AC power; filtering means connected to the AC power supply circuit for filtering an output current from the AC power supply circuit; step-up converter means connected to the filtering means, for generating a saw tooth wave signal in response to an output voltage from the filtering means, the saw tooth wave signal having a peak value following an input voltage to the AC power supply circuit when a switch ON operation is performed; clamping means connected in common to the up converter means, AC power supply circuit and filtering means, for clamping an output voltage from the step-up converter means to a desired level; transformer means having a primary coil connected to the step-up converter means; and output means connected to a secondary coil of the transformer means.

BRIEF DESCRIPTION OF THE DRAWINGS

The above and other objectives, features and advantages of the present invention will be more clearly understood from the following detailed description taken in conjunction with the accompanying drawings, in which.

DETAILED DESCRIPTION OF THE PREFERRED EMBODIMENTS

Figure 1:
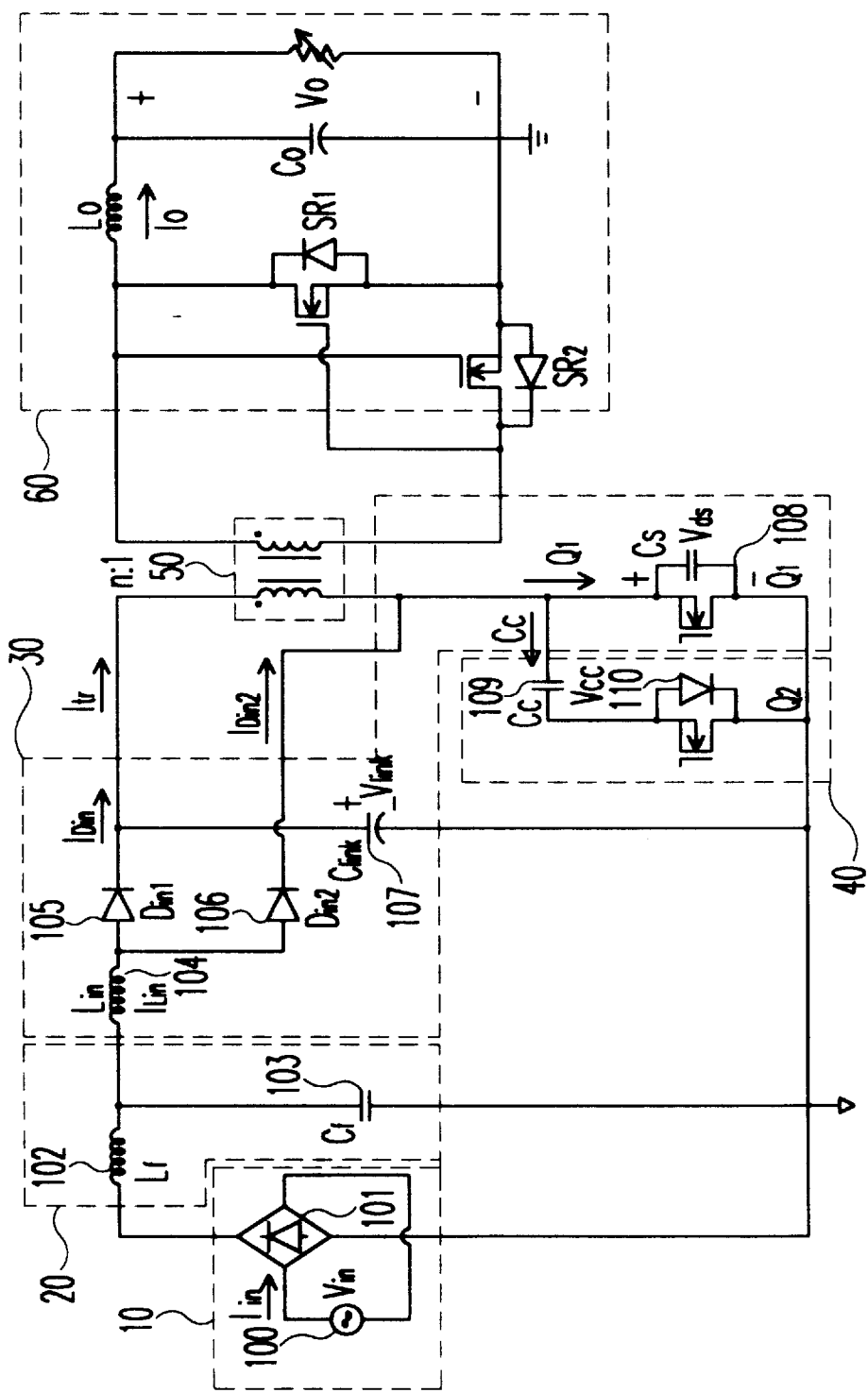
FIG. 1 is a circuit diagram illustrating the construction of a switch coupled active forward converter in accordance with an embodiment of the present invention.

FIG. 1 is a circuit diagram illustrating the construction of a switch coupled active forward converter in accordance with an embodiment of the present invention. In this drawing, the reference numeral 10 designates an alternating current (AC) power supply circuit, 20 designates a filtering circuit, 30 designates an step-up converter, 40 designates a clamp circuit, 50 designates a transformer and 60 designates an output circuit.

In accordance with the preferred embodiment of the present invention, the switch coupled active forward converter is implemented on the basis of a conventional forward AC-DC converter. The step-up converter 30 is additionally formed between a switch and an input inductor of the conventional forward AC-DC converter.

The AC power supply circuit 10 is provided with an AC power source 100 and a bridge circuit 101. The filtering circuit 20 includes an inductor 102 having its one side connected to the bridge circuit 101 in the AC power supply circuit 10, and a capacitor 103 having its one side connected to the other side of the inductor 102 and its other side connected to a ground voltage terminal.

The step-up converter 30 includes an inductor 104 having its one side connected to a connection point of the inductor 102 and capacitor 103 in the filtering circuit 20, and first and second diodes 105 and 106 for preventing a reverse current from flowing to the inductor 104. The first diode 105 has its anode connected to the other side of the inductor 104 and its cathode connected to one side of a primary coil of the transformer 50. The second diode 106 has its anode connected to a connection point of the inductor 104 and first diode 105 and its cathode connected to the other side of the primary coil of the transformer 50. The step-up converter 30 further includes a switch Q1 108 for performing a switching operation in response to a control voltage. The switch 108 has its one side connected to a connection point of the second diode 106 and primary coil of the transformer 50 and its other side connected to the bridge circuit 101 in the AC power supply circuit 10. The step-up converter 30 further includes a capacitor 107 for absorbing a ripple energy in the switching operation of the switch 108. The capacitor 107 has its one side connected to a connection point of the first diode 105 and primary coil of the transformer 50 and its other side connected to the bridge circuit 101 in the AC power supply circuit 10.

The clamp circuit 40 includes a capacitor 109 having its one side connected to a connection point of the primary coil of the transformer 50 and switch 108, and a switching diode Q2 110 having its one side connected to the other side of the capacitor 109 and its other side connected to the bridge circuit 101 in the AC power supply circuit 10.

The output circuit 60 is connected to a secondary coil of the transformer 50 to output a voltage which is induced in the secondary coil due to an electromotive force resulting from a voltage in the primary coil of the transformer 50.

The operation of the switch coupled active forward converter with the above-mentioned construction in accordance with the embodiment of the present invention will hereinafter be described in detail with reference to FIG. 2.

Figure 2:
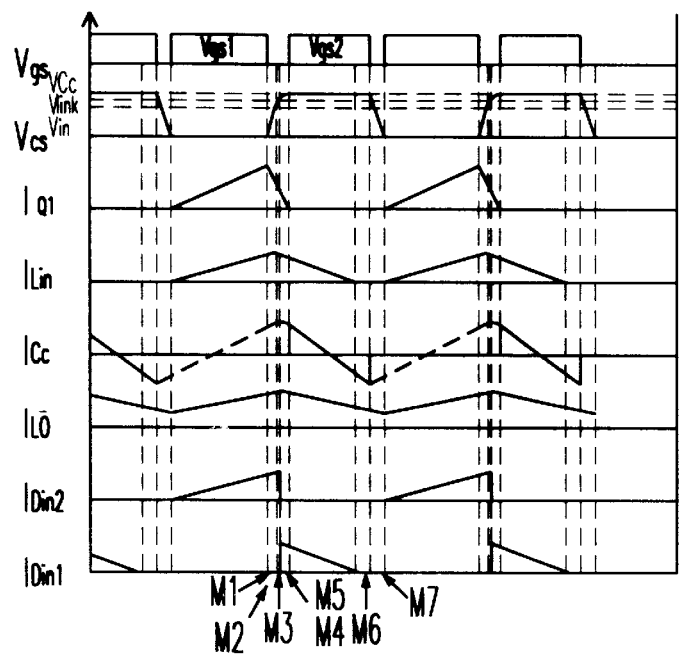
FIG. 2 is a waveform diagram of signals from components in FIG. 1.

FIG. 2 is a waveform diagram of signals from the components in FIG. 1. First, an output voltage from the AC power supply circuit 10 is filtered by the filtering circuit 20 and then applied to the inductor 104 in the step-up converter 30. At this time, if the switch Q1 108 in the step-up converter 30 is turned on in an operating mode M1, the voltage to the inductor 104 has a value of $|VV_{in}|$. As a result, current through the inductor 104 is increased at a slope of $|VV_1|./L_{in}$.

Then, a positive voltage is applied to the primary coil of the transformer 50 through the first diode 105, thereby causing energy to be induced in the secondary coil of the transformer 50. The energy induced in the secondary coil of the transformer 50 is transferred to the output circuit 60.

When a drain-source voltage of the switch Q1 108 is lower than the input voltage in an operating mode M2, the current through the inductor 104 is still increased at a slope of $|VV_{in}-V_{ds}|./L_{in}$. The first diode 105 is applied with a reverse voltage to be blocked. A voltage across the switch 108 has an abrupt slope resulting from the charging by magnetized current and output current.

In an operating mode M3, the voltage to the inductor 105 is lower than a voltage on the capacitor 107 in the step-up converter 30 and higher than the input voltage. In this case, the current through the inductor 104 begins to be reduced at a slope of $|VV_{in}-V_{ds}|./L_{in}$. The subsequent operation is performed in the same manner as that in the operating mode M2.

In an operating mode M4, the drain-source voltage of the switch Q1 108 is higher than the voltage on the capacitor 107 in the step-up converter 30. In this case, the output circuit 60 is separated from the transformer 50, resulting in a reduction in the slope of the drain-source voltage of the switch Q1 108.

In an operating mode M5, current flows to the clamp circuit 40 at the moment that the drain-source voltage of the switch Q1 108 becomes higher than the voltage on the capacitor 107, so that the drain-source voltage of the switch Q1 108 cannot be raised above a voltage on the capacitor 109 in the clamp circuit 40. Also, the current through the inductor 104 in the step-up converter 30 is linearly reduced to "0".

In an operating mode M6, the current to the clamp circuit 40 is inverted in direction, thereby causing it to be passed through the turned-on switch 110 in the clamp circuit 40. As a result, the converter is reset.

Finally, in an operating mode M7, the voltage across the switch 108 in the step-up converter 30 is lowered due to the current through the converter. This enables a zero voltage switching operation.

Figure 3:
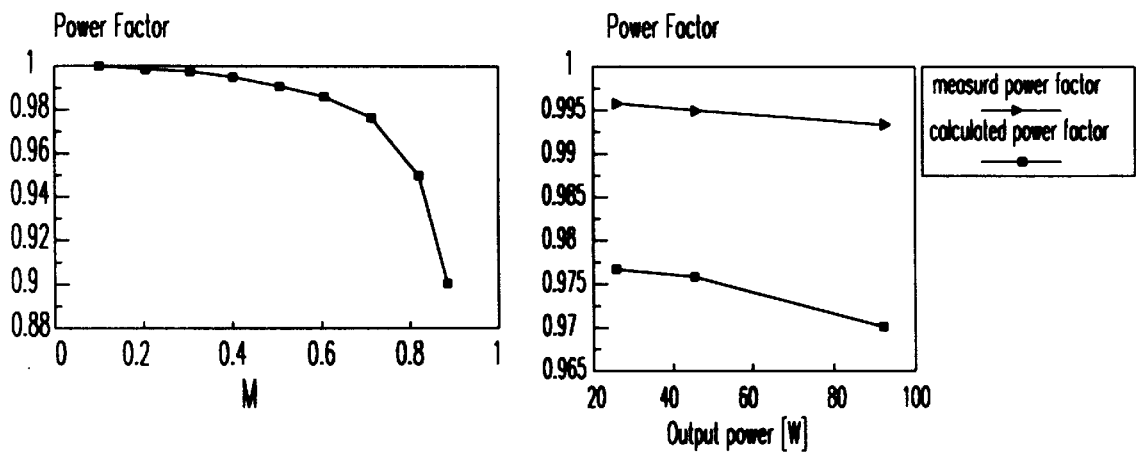
FIG. 3 is a waveform diagram showing simulated results of an improved power factor of the switch coupled active forward converter of the present invention.

FIG. 3 is a waveform diagram showing simulated results of an improved power factor of the switch coupled active forward converter of the present invention. Input current is subjected to distortion because it is not perfectly sinusoidal. The distortion can be defined as a ratio M of the maximum value of input voltage to a DC link voltage $V_{link}$. As a result, the power factor PF can be expressed as follows:

$$PF = \frac{\sqrt{\frac{2}{\pi}} \cdot \int_0^x \sin \omega t \cdot \frac{(M \cdot \sin \omega t)}{(1 - M \cdot \sin \omega t)} d\omega t}{\sqrt{\int_0^x \frac{(M \cdot \sin \omega t)^2}{(1 - M \cdot \sin \omega t)^2} d\omega t}} \quad (1)$$

$$M = \frac{V_{inmax}}{V_{link}} \quad (2)$$

In the above equation (1), the power factor PF becomes smaller than or equal to 0.95 if the distortion M is greater than or equal to 0.8. For this reason, the converter was designed in such a manner that the distortion M could not exceed 0.8. Also, the converter was designed to have a switching frequency of 100 KHz, an AC input voltage of 110 Vrms and a DC output voltage of 5 V.

Figure 4:
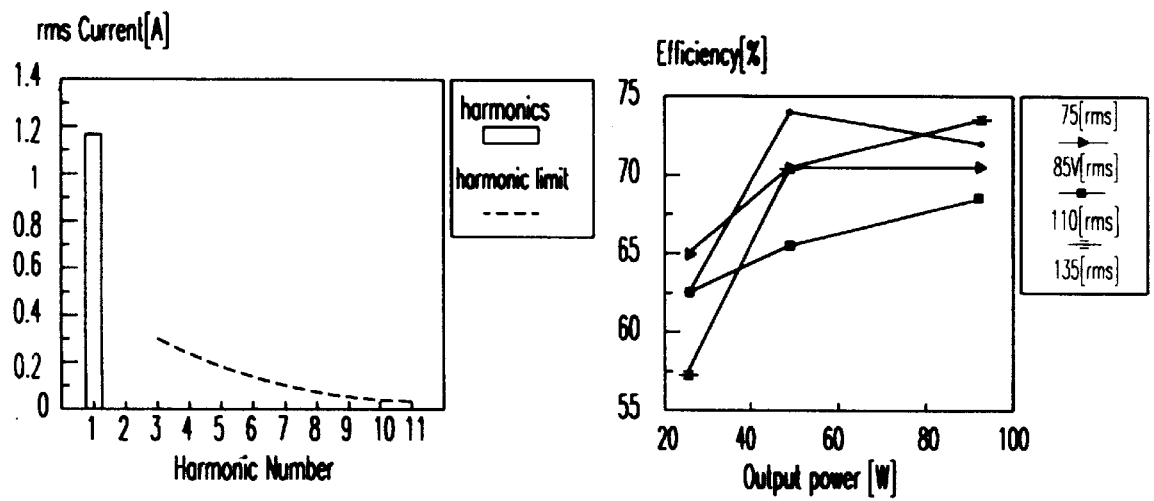
FIG. 4 is a waveform diagram showing the comparison between a harmonic spectrum of the switch coupled active forward converter of the present invention and standard efficiency waveforms.

FIG. 4 is a waveform diagram showing the comparison between a harmonic spectrum of the switch coupled active forward converter of the present invention and standard efficiency waveforms. The switch coupled active forward converter of the present invention has a power factor of 0.965.

Figure 5:
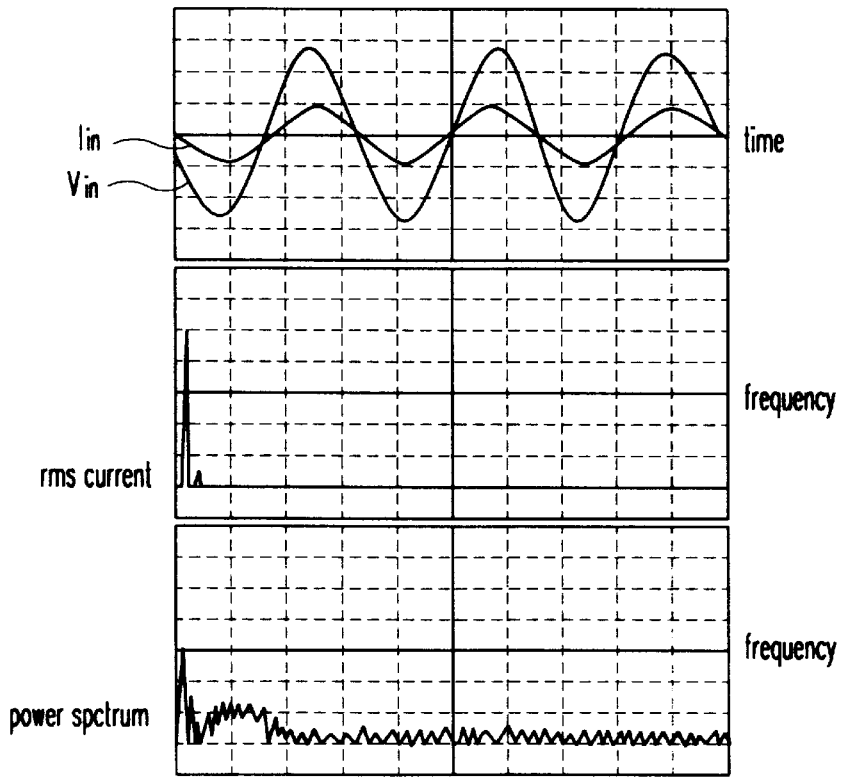
FIG. 5 is a waveform diagram showing harmonic distortions of input voltage and current of the switch coupled active forward converter of the present invention.

FIG. 5 is a waveform diagram showing harmonic distortions of input voltage and current of the switch coupled active forward converter of the present invention.

As is apparent from the above description, according to the present invention, the switch coupled active forward converter has the desired power factor and high efficiency. Also, the harmonic distortion is small because the input current has the low harmonic component. Further, the output voltage control operation can accurately be performed at the single power stage. Moreover, the desired DC power can be obtained from the AC power source.

Therefore, the switch coupled active forward converter of the present invention is applicable to a low-capacity power supply device such as a computer power supply device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A switch coupled active forward converter comprising:

AC power supply circuit for supplying AC power;

filtering means connected to said AC power supply circuit, for filtering an output current from said AC power supply circuit;

step-up converter means connected to said filtering means, for generating a saw tooth wave signal in response to an output voltage from said filtering means, said saw tooth wave signal having a peak value following an input voltage to said AC power supply circuit when a switch ON operation is performed;

transformer means having a primary coil connected to said step-up converter means, wherein said step-up converter means includes:

an inductor having its one side connected to said filtering means;

first and second diodes for preventing a reverse current from flowing to said inductor, said first diode having its anode connected to the other side of said inductor and its cathode connected to one side of said primary coil of said transformer means, said second diode having its anode connected to said inductor and to said first diode and its cathode connected to the other side of said primary coil of said transformer means;

a first switch for performing a switching operation in response to a control voltage, said first switch having its one side connected to said second diode and to said primary coil of said transformer means and its other side connected to said AC power supply circuit;

a first capacitor for absorbing a ripple energy in the switching operation of said first switch, said first capacitor having its one side connected to said first diode and to said primary coil of said transformer means and its other side connected to said AC power supply circuit;

clamping means connected in common to said step-up converter means, AC power supply circuit and filtering means, for clamping an output voltage from said step-up converter means to a desired level; and output means connected to a secondary coil of said transformer means.

2. A switch coupled active forward converter as set forth in claim 1, wherein said clamping means includes:

a second capacitor having its one side connected to said primary coil of said transformer means and to said first switch; and a second switch having its one side connected to the other side of said second capacitor and its other side connected to said AC power supply circuit.

3. A switch coupled active forward converter as set forth in claim 1, wherein a value obtained by dividing the maximum value of the input voltage to said AC power supply circuit by a DC link voltage of said first capacitor in said step-up converter means does not exceed "0.8".

* * * * *